US012446784B2

(12) United States Patent
Park et al.

(10) Patent No.: US 12,446,784 B2
(45) Date of Patent: Oct. 21, 2025

(54) APPARATUS AND METHOD FOR ESTIMATING BLOOD PRESSURE, AND SENSOR FOR ESTIMATING THE SAME

(71) Applicant: SAMSUNG ELECTRONICS CO., LTD., Suwon-si (KR)

(72) Inventors: Sang Yun Park, Hwaseong-si (KR); Jae Min Kang, Seoul (KR); Tak Hyung Lee, Seoul (KR); Byung Hoon Ko, Hwaseong-si (KR); Seung Woo Noh, Seongnam-si (KR); Jin Woo Choi, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 826 days.

(21) Appl. No.: 17/748,425

(22) Filed: May 19, 2022

(65) Prior Publication Data
US 2023/0200665 A1 Jun. 29, 2023

(30) Foreign Application Priority Data
Dec. 23, 2021 (KR) .......................... 10-2021-0185976

(51) Int. Cl.
*A61B 5/021* (2006.01)
*A61B 5/00* (2006.01)
*A61B 5/024* (2006.01)

(52) U.S. Cl.
CPC ...... *A61B 5/02116* (2013.01); *A61B 5/02416* (2013.01); *A61B 5/7235* (2013.01); *A61B 2562/0247* (2013.01)

(58) Field of Classification Search
CPC ............ A61B 5/02116; A61B 5/02416; A61B 5/7235; A61B 2562/0247; A61B 5/022;
(Continued)

(56) References Cited

U.S. PATENT DOCUMENTS 5,115,346 A * 5/1992 Lynam ................. G02F 1/1503
359/603
8,628,476 B2 1/2014 Utsuno et al.
(Continued)

FOREIGN PATENT DOCUMENTS

CN 106333662 A 1/2017
CN 108124420 A 6/2018
(Continued)

OTHER PUBLICATIONS

Communication issued Mar. 17, 2025 by the China National Intellectual Property Administration in Chinese Patent Application No. 202210656536.3.
(Continued)

*Primary Examiner* — Bo Joseph Peng
(74) *Attorney, Agent, or Firm* — Sughrue Mion, PLLC

(57) ABSTRACT

An apparatus for estimating blood pressure includes: a sensor, and a processor configured to estimate blood pressure based on a PPG signal and a contact pressure signal measured by the sensor. The sensor includes: a transparent elastic body; a first polarizing film provided on a surface of the transparent elastic body and configured to come into contact with the object; a light source provided under the transparent elastic body and configured to emit light toward the object; a first detector and a second detector provided under the transparent elastic body and configured to detect light, passing through the first polarizing film after being emitted by the light source and scattered or reflected from the object, to measure the PPG signal; and a second detector provided under the transparent elastic body and configured to detect light, not passing through the first polarizing film, to measure the contact pressure signal.

20 Claims, 13 Drawing Sheets

(58) Field of Classification Search
CPC . A61B 5/681; A61B 5/02225; A61B 5/02108; A61B 5/6843; A61B 5/6898; A61B 5/7275; A61B 2562/0233
See application file for complete search history.

(56) References Cited

U.S. PATENT DOCUMENTS

| | | | |
|---|---|---|---|
| 9,737,220 B2 | 8/2017 | Kim et al. | |
| 9,895,067 B2 | 2/2018 | Park et al. | |
| 10,623,849 B2 | 4/2020 | Wagner et al. | |
| 2004/0167409 A1* | 8/2004 | Lo | A61B 5/02438 600/485 |
| 2011/0054277 A1 | 3/2011 | Pinter et al. | |
| 2016/0198962 A1 | 7/2016 | Park et al. | |
| 2017/0007138 A1 | 1/2017 | Kim et al. | |
| 2017/0079535 A1 | 3/2017 | Tchertkov et al. | |
| 2017/0083745 A1 | 3/2017 | Goodelle et al. | |
| 2017/0135633 A1* | 5/2017 | Connor | A61N 1/36557 |
| 2017/0164878 A1* | 6/2017 | Connor | G09B 19/00 |
| 2017/0220840 A1 | 8/2017 | Wickboldt et al. | |
| 2017/0220844 A1 | 8/2017 | Jones et al. | |
| 2018/0042513 A1* | 2/2018 | Connor | A61B 5/369 |
| 2018/0156660 A1 | 6/2018 | Turgeon et al. | |
| 2018/0279892 A1 | 10/2018 | Qi et al. | |
| 2019/0167118 A1 | 6/2019 | Vilenskii et al. | |
| 2019/0336017 A1 | 11/2019 | Robinson et al. | |
| 2019/0336062 A1 | 11/2019 | Choi et al. | |
| 2021/0022622 A1 | 1/2021 | Lee et al. | |
| 2021/0022677 A1 | 1/2021 | Kang et al. | |

FOREIGN PATENT DOCUMENTS

| | | |
|---|---|---|
| CN | 111513699 A | 8/2020 |
| EP | 3 662 821 A1 | 6/2020 |
| EP | 3818930 A1 | 5/2021 |
| KR | 10-2012-0108575 A | 10/2012 |
| KR | 10-2016-0086710 A | 7/2016 |
| KR | 10-2017-0006106 A | 1/2017 |
| KR | 10-2017-0142450 A | 12/2017 |
| KR | 10-2019-0095715 A | 8/2019 |
| WO | 2009/136341 A2 | 11/2009 |

OTHER PUBLICATIONS

Communication dated Dec. 22, 2022 issued by the European Patent Office in EP Application No. 22187833.3.
Communication dated Sep. 21, 2023, issued by Korean Intellectual Property Office in Korean Patent Application No. 10-2021-0185976.

* cited by examiner

APPARATUS AND METHOD FOR ESTIMATING BLOOD PRESSURE, AND SENSOR FOR ESTIMATING THE SAME

CROSS-REFERENCE TO RELATED APPLICATION(S)

This application claims priority from Korean Patent Application No. 10-2021-0185976, filed on Dec. 23, 2021, in the Korean Intellectual Property Office, the entire disclosure of which is incorporated herein by reference in its entirety.

BACKGROUND

1. Field

Example embodiments of the disclosure relate to technology for estimating blood pressure without using a cuff.

2. Description of the Related Art

When observing blood movement on a body surface to identify cardiovascular characteristics, the following two methods are mainly used, which include: a method of measuring blood pressure from the skin surface by using a pressure sensor; and a method of measuring a change in volume of blood flow underneath the skin by using light.

In the former method, a vascular age or cardiovascular health may be estimated by calculating vascular compliance and the like by analyzing a shape of the pressure profile of the skin surface.

In the latter method, oxygen saturation may be estimated by estimating a ratio between oxyhemoglobin and deoxyhemoglobin using two or more wavelengths.

The above two methods measure pressure and volume, respectively, and thus are useful when providing information synchronized with the heartbeat. However, if sensors used in the two methods are provided as a combined sensor, a difference occurs between a position for measuring pressure of the skin surface and a position for measuring a change in blood volume, and it may be difficult to manufacture the sensor in a compact size.

SUMMARY

In accordance with an example embodiment, there is provided an apparatus for estimating a blood pressure, the apparatus including: a sensor configured to measure a photoplethysmography (PPG) signal and a contact pressure signal from an object that is in contact with the sensor; and a processor configured to estimate a blood pressure based on the PPG signal and the contact pressure signal which are measured by the sensor, wherein the sensor includes: a transparent elastic body; a first polarizing film provided on a surface of the transparent elastic body and configured to come into contact with the object; a light source provided under the transparent elastic body and configured to emit a light toward the object; a first detector provided under the transparent elastic body and configured to detect a light, passing through the first polarizing film after being emitted by the light source and scattered or reflected from the object, to measure the PPG signal; and a second detector provided under the transparent elastic body and configured to detect a light, not passing through the first polarizing film, to measure the contact pressure signal.

The second detector may be further configured to detect a light reflected from the transparent elastic body.

The sensor may further include a second polarizing film, the second polarizing film being provided over the second detector and configured to block the light passing through the first polarizing film.

A polarization direction of the first polarizing film may be perpendicular to a polarization direction of the second polarizing film.

A polarization direction of the first polarizing film may be a clockwise direction, and a polarization direction of the second polarizing film may be a counterclockwise direction.

The light source, the first detector, the second detector, and the transparent elastic body may be spaced apart from each other by an air gap provided therebetween.

The transparent elastic body may include at least one of silicone, styrenic block copolymer, or elastomer.

The transparent elastic body may have a thickness of 2 mm to 10 mm.

The processor may be further configured to convert a light intensity, which is measured by the second detector and is changed according to a pressure applied to the transparent elastic body, into a contact pressure value.

The processor may be further configured to obtain an oscillometric waveform envelope based on the PPG signal and the contact pressure signal, and estimate the blood pressure by using the obtained oscillometric waveform envelope.

The processor may be further configured to obtain at least one feature value, based on at least one of a first contact pressure value at a maximum amplitude point, a second contact pressure value at a left point of the maximum amplitude point and having a preset ratio to the first contact pressure value in the oscillometric waveform envelope, or a third contact pressure value at a right point of the maximum amplitude point and having the preset ratio to the first contact pressure value, and estimate the blood pressure based on the obtained at least one feature value.

In accordance with an example embodiment, there is provided a sensor including: a transparent elastic body; a first polarizing film provided on a surface of the transparent elastic body and configured to come into contact with an object; a light source provided under the transparent elastic body and configured to emit a light toward the object; a first detector provided under the transparent elastic body and configured to detect a light, passing through the first polarizing film after being emitted by the light source and scattered or reflected from the object, to measure a photoplethysmography (PPG) signal; and a second detector provided under the transparent elastic body and configured to detect a light, not passing through the first polarizing film, to measure a contact pressure signal.

The second detector may be further configured to detect a light reflected from the transparent elastic body.

The sensor may further include a second polarizing film provided over the second detector and configured to block the light passing through the first polarizing film.

A polarization direction of the first polarizing film may be perpendicular to a polarization direction of the second polarizing film.

A polarization direction of the first polarizing film may be a clockwise direction, and a polarization direction of the second polarizing film may be a counterclockwise direction.

The light source, the first detector, the second detector, and the transparent elastic body may be spaced apart from each other by an air gap provided therebetween.

The transparent elastic body may have a thickness of 2 mm to 10 mm.

In accordance with an example embodiment, there is provided a method of estimating a blood pressure, by using a sensor including a transparent elastic body, a first polarizing film provided on the transparent elastic body, a light source, a first detector, and a second detector, the method including: by using the light source provided under the transparent elastic body, emitting light toward an object; by using the first detector provided under the transparent elastic body, detecting light, scattered or reflected from the object and passing through the first polarizing film, to measure a photoplethysmography (PPG) signal; by using the second detector provided under the transparent elastic body, detecting light, not passing through the first polarizing film, to measure a contact pressure signal; and estimating a blood pressure based on the PPG signal and the contact pressure signal.

The estimating of the blood pressure may include obtaining an oscillometric waveform envelope based on the PPG signal and the contact pressure signal, and estimating the blood pressure by using the obtained oscillometric waveform envelope.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
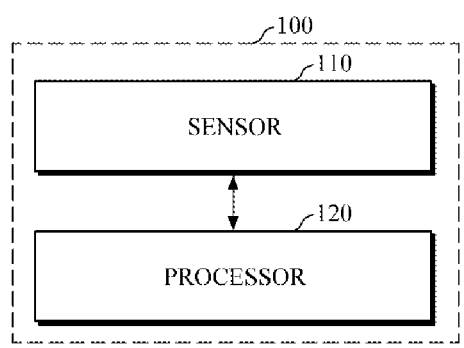
FIG. 1 is a block diagram illustrating an apparatus for estimating blood pressure according to an example embodiment.

Details of other embodiments are included in the following detailed description and drawings. Advantages and features of the disclosure, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit for performing at least one function or operation and that may be embodied as hardware, software, or a combination thereof.

Hereinafter, embodiments of an apparatus and method for estimating blood pressure will be described in detail with reference to the accompanying drawings.

FIG. 1 is a block diagram illustrating an apparatus for estimating blood pressure according to an example embodiment. FIGS. 2A to 2E are diagrams illustrating examples of structures of a sensor in an apparatus for estimating blood pressure according to an example embodiment.

An apparatus 100 for estimating blood pressure may be mounted in various devices such as a portable wearable device, a smart device, and the like. For example, various devices may include various types of wearable devices, such as a smart watch worn on the wrist, a smart band wearable device, a headphone-type wearable device, a headband-type wearable device, etc., and a mobile device such as a smartphone, a tablet PC, etc., but the devices are not limited thereto. The apparatus of an example embodiment may estimate blood pressure among bio-information, but the bio-information which may be estimated may include, for example, heart rate, vascular age, arterial stiffness, aortic pressure waveform, vascular compliance, stress index, fatigue level, skin elasticity, skin age, etc., but is not limited thereto.

Referring to FIG. 1, the apparatus 100 for estimating blood pressure may include a sensor 110 and a processor 120.

The sensor 110 may obtain data for estimating blood pressure from an object, and the processor 120 may estimate blood pressure of the object by using the data obtained by the sensor 110. The processor 120 and the sensor 110 may be electrically connected to each other, and the processor 120 may control the sensor 110 in response to a request for estimating blood pressure. The object may be a body part that may come into contact with the sensor 110, and may be, for example, a body part where pulse waves may be easily measured using a photoplethysmography (PPG) signal. For example, the object may be a finger where blood vessels are densely distributed, but is not limited thereto, and may be a surface of the wrist that is adjacent to the radial artery, an upper part of the wrist where veins or capillaries are located, or peripheral parts of the body, such as toes and the like.

Referring to FIGS. 2A to 2E, the sensor 110 may include a transparent elastic body 21, a first polarizing film 22, a light source 23, a first detector 24, a second detector 25, and a second polarizing film 26.

The transparent elastic body 21 is pressed against the skin, e.g., the wrist, where blood vessels are located, and may include a material for displaying a curvature of wrist skin. An outward appearance of the transparent elastic body 21 may be changed when predetermined contact pressure is applied thereto. For example, the transparent elastic boy 21 may include silicone, styrenic block copolymer, or thermoplastic elastomer. In addition, the transparent elastic body 21 is formed thin so as to be deformed along a curvature on the skin surface of the object OBJ. For example, the transparent elastic body 21 may have a thickness of approximately 2 mm to 10 mm. Further, the transparent elastic body 21 may be formed as a curved surface or a flat surface, but the shape thereof is not limited thereto.

Figure 2A:
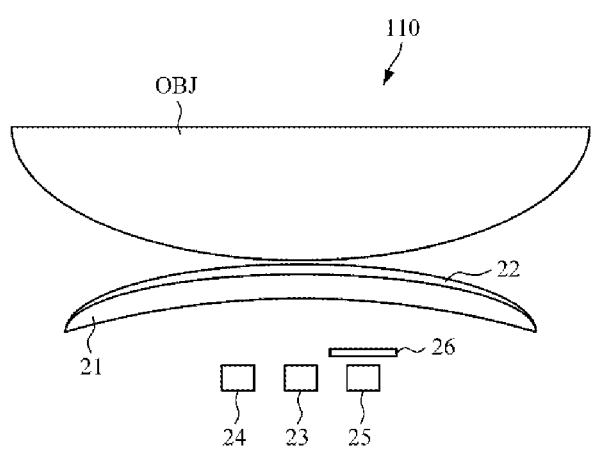
FIGS. 2A to 2E are diagrams illustrating examples of structures of a sensor in an apparatus for estimating blood pressure according to an example embodiment.
Figure 2B:
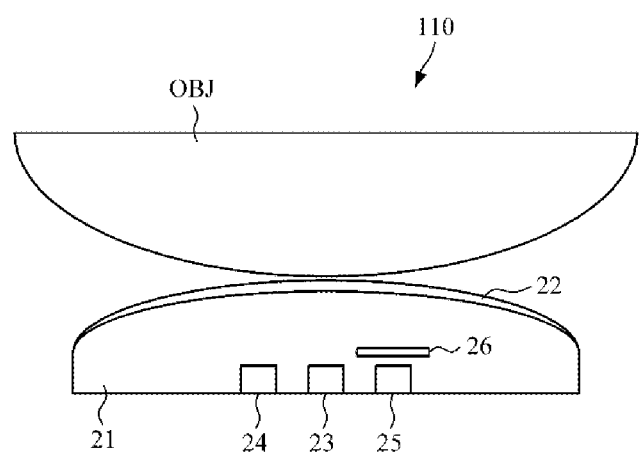

Referring to FIG. 2A, the transparent elastic body 21 is disposed over the light source 23, the first detector 24, and the second detector 25; and the light source 23, the first detector 24, the second detector 25, and the transparent elastic body 21 may be spaced apart from each other by air gaps formed therebetween. Further, referring to FIG. 2B, the transparent elastic body 21 may be formed in a single layer including the light source 23, the first detector 24, and the second detector 25. For example, the light source 23, the first detector 24, and the second detector 25 may be disposed in the transparent elastic body 21.

The first polarizing film 22 may be formed on a surface of the transparent elastic body 21 to come into contact with an object OBJ, and the second polarizing film 26 may be formed over the second detector 25. The first and the second polarizing films 22 and 26 may convert natural light, which is incident while vibrating in various directions, into polarized light vibrating in only one direction. Examples of the first and the second polarizing films 22 and 26 may include an iodine-based polarizing film, a dye-based polarizing film, a phase-difference polarizing film, a transflective polarizing film, etc., but the first and the second polarizing films are not limited thereto.

By using the first polarizing film 22 and the second polarizing film 26, light passing through the first polarizing film 22 may be blocked by the second polarizing film 26. For example, a polarization direction of the first polarizing film 22 is perpendicular to a polarization direction of the second polarizing film 26, such that the light having passed through the first polarizing film 22 may be blocked by the second polarizing film 26. For example, the first polarizing film 22 may polarize light at zero degrees, and the second polarizing film 26 may polarize light at 90 degrees. Alternatively, the polarization direction of the first polarizing film 22 may be a clockwise direction, and the polarization direction of the second polarizing film 26 may be a counterclockwise direction, such that the light passing through the first polarizing film 22 may be blocked by the second polarizing film 26. However, the disclosure is not limited to the above example.

The light source 23 may be disposed under the transparent elastic body 21 to emit light toward the object OBJ. The light source 23 may include a light emitting diode (LED), a laser diode (LD), a phosphor, etc., and may emit light in the Near Infrared Ray (NIR) range or the Mid Infrared Ray (MIR) range. The wavelength range of the emitted light is not limited thereto.

The first and the second detectors 24 and 25 may measure spectra by detecting light. The first and the second detectors 24 and 25 may include one or more pixels, each of which may include a photodiode, a photo transistor (PTr), an image sensor (e.g., complementary metal-oxide semiconductor (CMOS) image sensor), etc., but is not limited thereto. In addition, the sensor 110 may be formed with an array of a plurality of light sources and/or an array of a plurality of detectors for measuring two or more bio-signals (e.g., PPG signal). In this case, the plurality of light sources may emit light of different wavelengths. The respective light sources may be positioned at different distances from the detector. For convenience of explanation, the following description will be given of an example in which the sensor 110 includes one light source 23, the first detector 24, and the second detector 25.

When the light source 23 emits light toward a user's skin, which is the object OBJ, according to a control signal of the processor 120, the emitted light passes through the user's skin to reach body tissue, and the light reaching the body tissue is scattered or reflected from the user's body tissue to return through the skin.

The first detector 24 may measure a PPG signal by detecting the light returning through the user's skin.

Figure 2C:
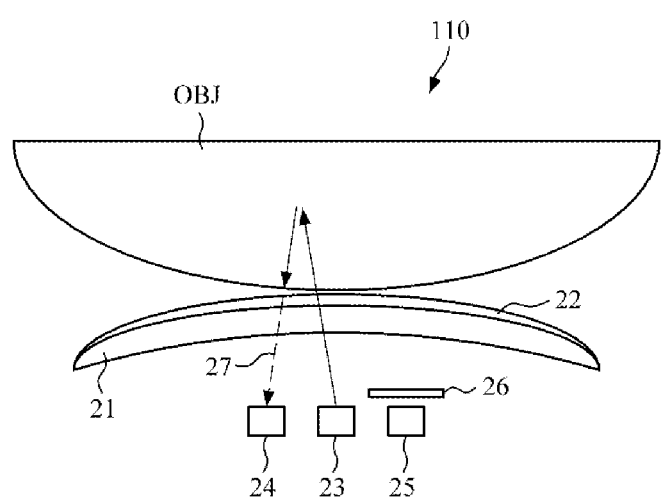

Referring to FIG. 2C, when the light source 23 emits light toward the user's skin which is the object OBJ, the emitted light may pass through the user's skin to reach body tissue (e.g., radial artery). The light reaching the body tissue is scattered or reflected from the user's body tissue to return through the user's skin, in which the light may return after passing through the first polarizing film 22 formed on the surface of the transparent elastic body 21. In this case, the first detector 24 may detect polarized light 27 passing through the first polarizing film 22, and may measure the PPG signal by using the detected polarized light 27.

The first detector 24 may also detect light reflected from the transparent elastic body 21. In this case, by performing preprocessing such as filtering (e.g., band-pass filtering) for removing noise, the processor 120 may remove the light reflected from the transparent elastic body 21, thereby minimizing the effect of light that does not include a bio-signal.

The second detector 25 may be disposed under the transparent elastic body 21 and may measure a contact pressure signal by detecting light passing through the first polarizing film 22.

Figure 2D:
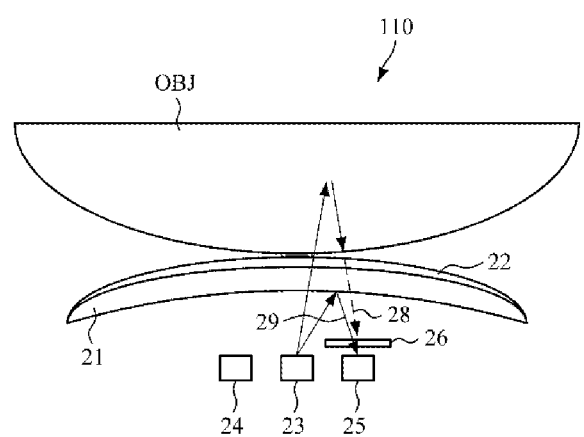

Referring to FIG. 2D, when the light source 23 emits light toward the user's skin which is the object OBJ, the emitted light passes through the user's skin to reach body tissue. The light reaching the body tissue may be scattered or reflected from the user's body tissue to return through the user's skin, in which the light may return after passing through the first polarizing film 22 formed on the surface of the transparent elastic body 21. In this case, light 28 passing through the first polarizing film 22 may be blocked by the second polarizing film 26 formed over the second detector 25. For example, a polarization direction of the first polarizing film 22 may be perpendicular to a polarization direction of the second polarizing film 26, or the polarization direction of the first polarizing film 22 may be a clockwise direction, and the polarization direction of the second polarizing film 26 may be a counterclockwise direction. In this arrangement, the light 28, including a bio-signal, may be blocked by the second polarizing film 26 and thus may not be detected by the second detector 25.

The second detector 25 may detect light 29 reflected from the transparent elastic body 21. For example, the light 29, emitted by the light source 23 and reflected from the transparent elastic body 21, passes through the second polarizing film 26 formed over the second detector 25. Accordingly, the second detector 25 may detect the polarized light 29 passing through the second polarizing film 26, and may measure a contact pressure signal by using the detected polarized light 29.

Figure 2E:
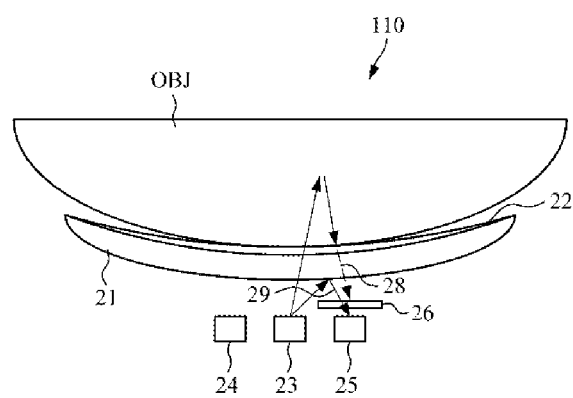

FIG. 2E is a diagram illustrating a structure of the sensor 110 when pressure is applied to the transparent elastic body 21.

FIG. 2D illustrates a state in which the object OBJ is in contact with the transparent elastic body 21, and FIG. 2E illustrates an example in which the object OBJ applies pressure downwardly such that the transparent elastic body 21 becomes convex downward.

Referring to FIGS. 2D and 2E, an optical path length of light reflected from the transparent elastic body 21 and detected by the second detector 25 in FIG. 2E is shorter than an optical path length of light in FIG. 2D. Accordingly, it can be seen that an intensity of light detected by the second detector 25 in FIG. 2E is greater than an intensity of light detected by the second detector 25 in FIG. 2D. That is, the transparent elastic body 21 is deformed by a change in pressure applied to the transparent elastic body 21, and the second detector 25 may measure a change in light intensity according to the change in pressure and may measure a change in contact pressure based on the change in intensity of the light detected by the second detector 25.

In the related art, blood pressure is generally measured by using an optical sensor and a pressure sensor. In this case, it is difficult to manufacture the apparatus in a compact size, and the respective sensors are positioned apart from each other, such that a bio-signal and a pressure signal may not be measured at the same position. To solve this problem, an example embodiment may provide an apparatus in a compact size by including only the optical sensor without a separate pressure sensor, and for simultaneously measuring the bio-signal and the pressure signal at the same position.

Referring back to FIG. 1, the processor 120 may estimate blood pressure by using the PPG signal and the contact pressure signal which are measured by the sensor 110.

For example, the processor 120 may obtain an oscillometric waveform envelope based on the PPG signal and the contact pressure signal, and may estimate blood pressure by using the obtained oscillometric waveform envelope.

Figure 3A:
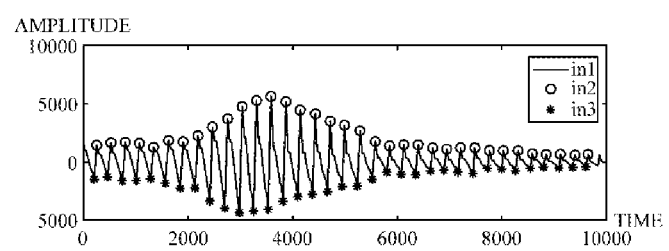
FIGS. 3A and 3B are diagrams explaining an example of estimating blood pressure based on oscillometry.
Figure 3B:
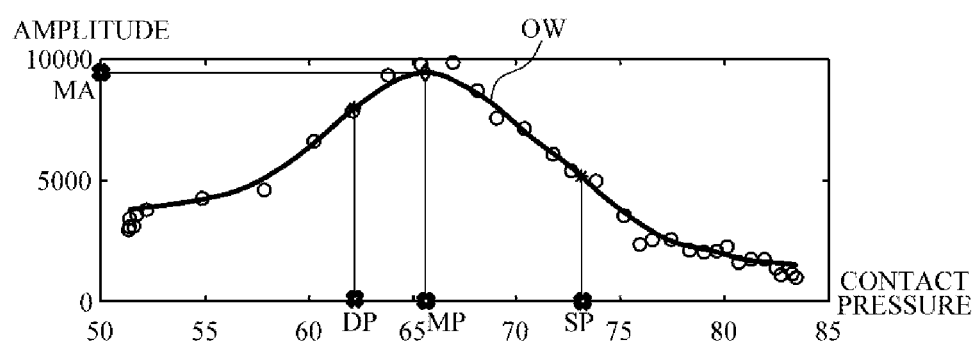

FIGS. 3A and 3B are diagrams explaining an example of estimating blood pressure based on oscillometry.

FIG. 3A is a diagram illustrating a change in amplitude of a PPG signal when an object placed on the sensor 110 gradually increases a pressing force. FIG. 3B is a diagram illustrating an oscillometric waveform envelope OW which represents a relationship between a change in contact pressure and an amplitude of a PPG signal. In this case, the contact pressure may be a value obtained by converting a light intensity, which is measured by the second detector 25 and is changed according to pressure applied to the transparent elastic body 21, into a contact pressure value by using a predefined conversion equation.

For example, the processor 120 may extract a peak-to-peak point by subtracting a negative (−) amplitude value in3 from a positive (+) amplitude value in2 of a waveform envelope in1 of the pulse wave signal at each measurement time point. Further, the processor 120 may obtain an oscillometic waveform envelope OW by plotting the peak-to-peak amplitude at each measurement time point against a contact pressure value at a corresponding time point and by performing, for example, polynomial curve fitting.

The processor 120 may estimate, for example, blood pressure by using the generated oscillometic waveform envelope OW. The processor 120 may estimate Mean Arterial Pressure (MAP) based on a contact pressure value MP at a maximum point MA of the pulse wave in the oscillogram. For example, the processor 120 may determine, as the MAP, the contact pressure value MP itself at the maximum point MA of the pulse wave, or may obtain the MAP from the contact pressure value MP by using a pre-defined MAP estimation equation. In this case, the MAP estimation equation may be expressed in the form of various linear or non-linear combination functions, such as addition, subtraction, division, multiplication, logarithmic value, regression equation, and the like, with no particular limitation.

Further, the processor 120 may obtain, as a feature value, at least one of a contact pressure value at a maximum amplitude point and contact pressure values at left and right points of the maximum amplitude point and having a preset ratio to the contact pressure value at the maximum amplitude point in the oscillometric waveform envelope, and may estimate blood pressure based on the obtained feature value. For example, the processor 120 may estimate diastolic blood pressure and systolic blood pressure by using contact pressure values DP and SP, respectively, which are at the left and right points of the maximum point MA of the pulse wave, and which correspond to amplitude values having a preset ratio, e.g., 0.5 to 0.7, to the amplitude value at the maximum point MA of the pulse wave. The processor 120 may determine the contact pressure values DP and SP as the diastolic blood pressure and systolic blood pressure, respectively, or may estimate the diastolic blood pressure and systolic blood pressure from the respective contact pressure values DP and SP by using pre-defined diastolic blood pressure and systolic blood pressure estimation equations.

Figure 4:
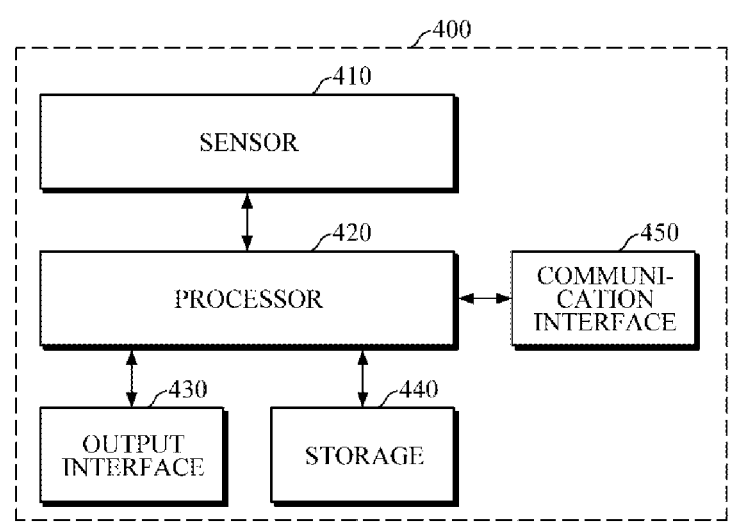
FIG. 4 is a block diagram illustrating an apparatus for estimating blood pressure according to an example embodiment.

FIG. 4 is a block diagram illustrating an apparatus for estimating blood pressure according to an example embodiment.

Referring to FIG. 4, an apparatus 400 for estimating blood pressure may include a sensor 410, a processor 420, an output interface 430, a storage 440, and a communication interface 450. The sensor 410 and the processor 420 are the same as the sensor 110 and the processor 120 in the embodiment of FIG. 1, such that a detailed description thereof will be omitted.

The output interface 430 may provide processing results of the processor 420 for a user. For example, the output interface 430 may display an estimated blood pressure value of the processor 420 on a display. In this case, if the estimated blood pressure value falls outside a normal range, the output interface 430 may provide a user with warning information by changing color, line thickness, etc., or displaying the abnormal value along with a normal range, so that the user may easily recognize the abnormal value. In addition, along with or without the visual output, the output interface 430 may provide an estimated blood pressure value for the user in a non-visual manner by voice, vibrations, tactile sensation, and the like using an audio output module such as a speaker, or a haptic module and the like.

In addition, the output interface 430 may display a blood pressure estimation process, performed by the processor 420, and results thereof in a visual manner such as a graph. Further, if the measured blood pressure is not of good quality (e.g., having low reliability), the output interface 430 may guide a user to re-measure blood pressure, to additionally measure blood pressure, or to terminate blood pressure estimation.

The storage 440 may store information related to estimating blood pressure. For example, the storage 440 may store the PPG signal acquired by the sensor 410, the processing results of the processor 420, e.g., the estimated blood pressure value, a contact pressure conversion model, and the like.

The storage 440 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The communication interface 450 may communicate with an external device to transmit and receive various data, related to estimating blood pressure, to and from the external device. The external device may include an information processing device such as a smartphone, a tablet PC, a desktop computer, a laptop computer, and the like. For example, the communication interface 450 may transmit a blood pressure estimation result to the external device, such as a user's smartphone and the like, so that the user may manage and monitor the estimation result by using a device having a relatively high performance. In addition, in the case where the external device includes a sensor for measuring blood pressure, the communication interface 450 may receive a PPG signal from the external device.

The communication interface 450 may communicate with the external device by using various wired or wireless communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, this is merely an example and is not intended to be limiting.

Figure 5:
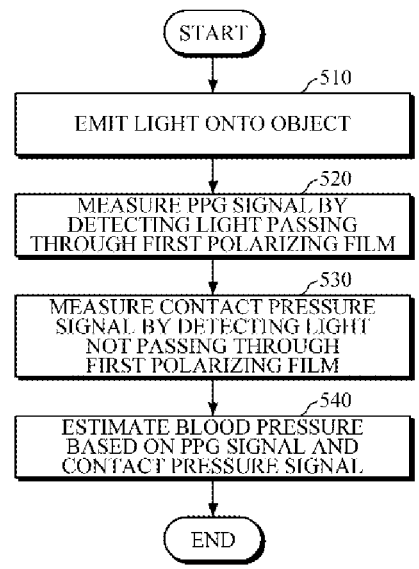
FIG. 5 is a flowchart illustrating a method of estimating blood pressure according to an example embodiment.

FIG. 5 is a flowchart illustrating a method of estimating blood pressure according to an example embodiment.

The method of FIG. 5 is an example of a method of estimating blood pressure which may be performed by the apparatuses 100 and 400 for estimating blood pressure according to the embodiments of FIGS. 1 and 4. Various embodiments thereof are described in detail above, and thus will be briefly described below.

First, the apparatus for estimating blood pressure may emit light toward an object by using the light source disposed under the transparent elastic body in 510. For example, the transparent elastic body may be disposed over the light source, the first detector, and the second detector; and the light source, the first detector, the second detector, and the transparent elastic body may be spaced apart from each other by air gaps formed therebetween. In addition, the transparent elastic body may include at least one of silicone, styrenic block copolymer, and elastomer, and may have a thickness of 2 mm to 10 mm. Further, the transparent elastic body may have a curved surface or a flat surface. The shape of the transparent elastic body is not limited thereto.

Then, the apparatus for estimating blood pressure may measure a PPG signal by detecting light, scattered or reflected from the first detector disposed under the transparent elastic body, and passing through the first polarizing film in 520.

The apparatus for estimating blood pressure may measure a contact pressure signal by detecting light, not passing through the first polarizing film, by using the second detector disposed under the transparent elastic body in 530. For example, by using the second polarizing film formed over the second detector, the apparatus for estimating blood pressure may block the light passing through the first polarizing film, and may detect light, reflected from the transparent elastic body, by using the second detector. For example, a polarization direction of the first polarizing film may be perpendicular to a polarization direction of the second polarizing film each other, or the polarization direction of the first polarizing film may be a clockwise direction, and the polarization direction of the second polarizing film may be a counterclockwise direction, such that the light passing through the first polarizing film may be blocked by the second polarizing film 26. The transparent elastic body is deformed by a change in pressure applied to the transparent elastic body, and the second detector may measure a change in light intensity according to the change in pressure and may measure a change in contact pressure based on the change in intensity of the light detected by the second detector.

Next, the apparatus for estimating blood pressure may estimate blood pressure based on the measured PPG signal and contact pressure signal in 540. For example, the apparatus for estimating blood pressure may obtain an oscillometric waveform envelope based on the PPG signal and the contact pressure signal, and may estimate blood pressure by using the obtained oscillometric waveform envelope. In this case, the contact pressure may be a value obtained by converting a light intensity, which is measured by the second detector and is changed according to pressure applied to the transparent elastic body, into a contact pressure value by using a predefined conversion equation.

The apparatus for estimating blood pressure may obtain, as a feature value, at least one of a contact pressure value at a maximum amplitude point and contact pressure values at left and right points of the maximum amplitude point and having a preset ratio to the contact pressure value at the maximum amplitude point in the oscillometric waveform envelope, and may estimate blood pressure based on the obtained feature value(s).

Figure 6:
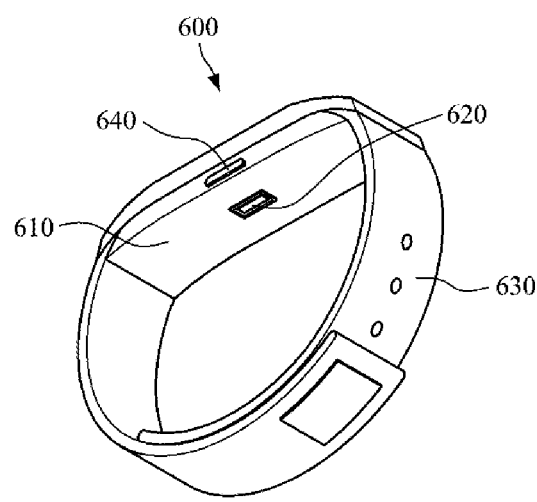
FIGS. 6, 7, and 8 are diagrams illustrating examples of an electronic device including an apparatus for estimating blood pressure according to an example embodiment.
Figure 7:
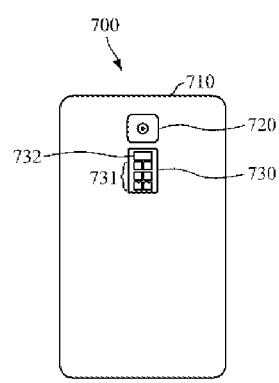
Figure 8:
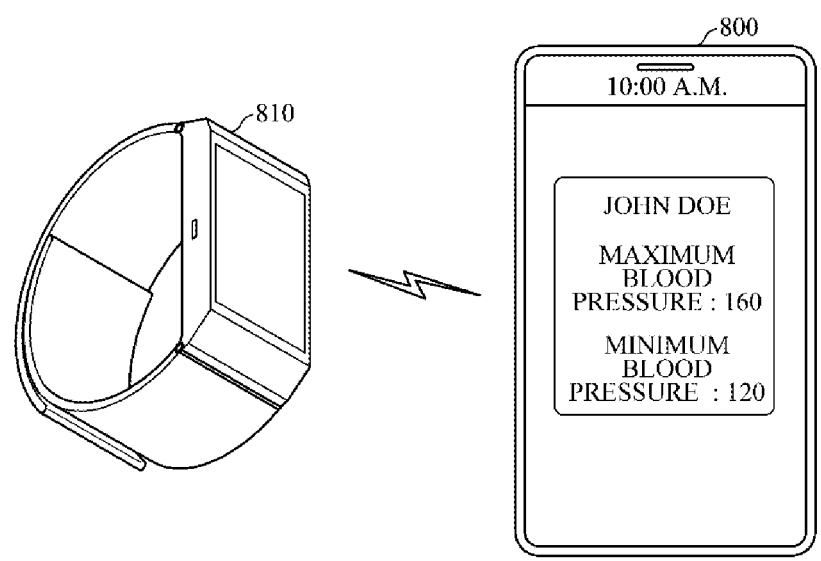

FIGS. 6 to 8 are diagrams illustrating examples of an electronic device including an apparatus for estimating blood pressure according to an example embodiment.

FIG. 6 is a diagram illustrating a wearable device according to an example embodiment. The aforementioned embodiments of the apparatuses 100 and 400 for estimating blood pressure may be mounted in the wearable device.

Referring to FIG. 6, a wearable device 600 may include a main body 610 and a strap 630.

The strap 630 may be connected to both ends of the main body 610, and may be flexible so as to be wrapped around a user's wrist. The strap 630 may include a first strap and a second strap which are separated from each other. One ends of the first strap and the second strap are connected to the main body 610, and the other ends of the first strap and the second strap may be connected to each other via a fastening means. The fastening means may include magnetic fastening, Velcro fastening, pin fastening, and the like, but is not limited thereto. Further, the strap 630 is not limited thereto, and may be integrally formed as a non-detachable band.

In this case, air may be injected into the strap 630 or the strap 630 may be provided with an air bladder, so as to have elasticity according to a change in pressure applied to the wrist, and the change in pressure of the wrist may be transmitted to the main body 610.

A battery may be embedded in the main body 610 or the strap 630 to supply power to the wearable device 600.

In addition, a sensor 620 may be mounted on one side of the main body 610. When an object is placed on the sensor 620, the sensor 620 may measure a PPG signal and a contact pressure signal. The sensor 620 may include a transparent elastic body; a first polarizing film formed on the surface of the transparent elastic body and coming into contact with the object; a light source disposed under the transparent elastic body and emitting light toward the object; a first detector disposed under the transparent elastic body and detecting light, emitted by the light source and scattered or reflected from the object, to measure the PPG signal; and a second detector disposed under the transparent elastic body and detecting light, not passing through the first polarizing film, to measure the contact pressure signal.

A processor may be mounted in the main body 610. The processor may be electrically connected to components mounted in the wearable device 600. As described above, the processor may estimate blood pressure by using the PPG signal and the contact pressure signal which are measured by the sensor 620. For example, the processor may obtain an oscillometric waveform envelope based on the PPG signal and the contact pressure signal, and may estimate blood pressure by using the obtained oscillometric waveform envelope. In this case, the processor may obtain, as a feature value, at least one of a contact pressure value at a maximum amplitude point and contact pressure values at left and right points of the maximum amplitude point and having a preset ratio to the contact pressure value at the maximum amplitude point in the oscillometric waveform envelope, and may estimate blood pressure based on the obtained feature value (s).

A storage may be included in the main body 610, and may store reference information for estimating blood pressure and for performing various functions of the wearable device 600, and information processed by various components.

In addition, the wearable device 600 may include a manipulator 640 mounted on one side of the main body 610 and configured to receive a user's control command and transmitting the received control command to the processor. The manipulator 640 may have a function of inputting a command to turn on/off the wearable device 600.

A display for outputting information to a user may be disposed on a front surface of the main body 610. The display may include a touch screen for receiving touch input. The display may receive a user's touch input and transmit the touch input to the processor, and may display processing results of the processor.

Moreover, the wearable device 600 may include a communication interface for communicating with an external device. The communication interface may transmit a blood pressure estimation result to an external device, e.g., a user's smartphone.

FIG. 7 is a diagram illustrating a smart device according to an example embodiment. In this case, the smart device may include a smartphone, a tablet PC, and the like. The smart device may have functions of the aforementioned apparatuses 100 and 400 for estimating bio-information.

Referring to FIG. 7, a smart device 700 includes a main body 710 and a sensor 730 mounted on one surface of the main body 710. For example, the sensor 730 may include one or more light sources 732 disposed at predetermined positions thereof. The one or more light sources 732 may emit light of different wavelengths. Further, in order to measure pulse wave signals at multiple points of the object, a plurality of light receivers 731 may be positioned at predetermined distances from the light sources 732. However, this is merely an example, and the sensor 730 may be arranged in various shapes, as described above.

In addition, when the object is placed on the sensor 730, the sensor 730 may measure a PPG signal and a contact pressure signal. The sensor 730 may include a transparent elastic body; a first polarizing film formed on the surface of the transparent elastic body and coming into contact with the object; a light source disposed under the transparent elastic body and emitting light toward the object; a first detector disposed under the transparent elastic body and detecting light, emitted by the light source and scattered or reflected from the object, to measure the PPG signal; and a second detector disposed under the transparent elastic body and detecting light, not passing through the first polarizing film, to measure the contact pressure signal.

In addition, a display may be mounted on a front surface of the main body 710. The display may visually output a blood pressure estimation result, a health condition evaluation result, and the like. The display may include a touch screen, and may receive information input through the touch screen and transmit the information to the processor.

The main body 710 may include an image sensor 720 as illustrated in FIG. 7. The image sensor 720 may capture various images, and when a user's object, e.g., a finger, approaches the sensor 730, the image sensor 720 may capture an image of the finger. In the case where a CIS image sensor is mounted in a light receiver 731 of the sensor 730, the image sensor 720 may be omitted.

As described above, the processor may estimate bio-information based on the PPG signal and the contact pressure signal which are measured by the sensor 730. A detailed description thereof will be omitted.

In addition, when a user transmits a request for estimating blood pressure by executing an application and the like installed in the smart device 700, the mobile device 700 may obtain data by using the sensor 730, and may estimate blood pressure and may provide the estimated value as images and/or sounds to the user by using the processor in the smart device 700.

FIG. 8 is a diagram illustrating an electronic device according to an example embodiment. Referring to FIG. 8, the electronic device may be implemented as a combination of a wristwatch-type wearable device 810 and a smartphone 800. For example, a processor for estimating blood pressure may be mounted in a main body of the smartphone 800. Upon receiving a request for estimating blood pressure, the processor of the smartphone 800 may communicate with a communication interface, mounted in the main body of the wearable device 810, to obtain data through the communication interface. Further, upon receiving data, such as the PPG signal, the contact pressure signal, etc., from the wearable device 810, the processor of the smartphone 800 may estimate blood pressure and may output an estimation result to a display of the smartphone 800 through an output interface, as illustrated herein. In this case, in response to a user's request, the processor may display not only a current estimated blood pressure value, but also continuous estimated blood pressure values over time on a display to provide the values to the user.

The disclosure be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for implementing an example embodiment of the disclosure may be readily deduced by programmers of ordinary skill in the art to which the disclosure pertains.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The disclosure has been described herein with regard to example embodiments. However, it will be obvious to those skilled in the art that various changes and modifications can be made without changing technical conception and essential features of the disclosure. Thus, it is clear that the above-described embodiments are illustrative in all aspects and are not intended to limit the disclosure.

What is claimed is:

1. An apparatus for estimating a blood pressure, the apparatus comprising:
    a sensor configured to measure a photoplethysmography (PPG) signal and a contact pressure signal from an object that is in contact with the sensor; and
    a processor configured to estimate a blood pressure based on the PPG signal and the contact pressure signal which are measured by the sensor,
    wherein the sensor comprises:
        a transparent elastic body;
        a first polarizing film provided on a surface of the transparent elastic body and configured to come into contact with the object;
        a light source provided under the transparent elastic body and configured to emit a light toward the object;
        a first detector provided under the transparent elastic body and configured to detect a light, passing through the first polarizing film after being emitted by the light source and scattered or reflected from the object, to measure the PPG signal; and
        a second detector provided under the transparent elastic body and configured to detect a light, not passing through the first polarizing film, to measure the contact pressure signal.

2. The apparatus of claim 1, wherein the second detector is further configured to detect a light reflected from the transparent elastic body.

3. The apparatus of claim 1, wherein the sensor further comprises a second polarizing film, the second polarizing film being provided over the second detector and configured to block the light passing through the first polarizing film.

4. The apparatus of claim 3, wherein a polarization direction of the first polarizing film is perpendicular to a polarization direction of the second polarizing film.

5. The apparatus of claim 3, wherein a polarization direction of the first polarizing film is a clockwise direction, and a polarization direction of the second polarizing film is a counterclockwise direction.

6. The apparatus of claim 1, wherein the light source, the first detector, the second detector, and the transparent elastic body are spaced apart from each other by an air gap provided therebetween.

7. The apparatus of claim 1, wherein the transparent elastic body comprises at least one of silicone, styrenic block copolymer, or elastomer.

8. The apparatus of claim 1, wherein the transparent elastic body has a thickness of 2 mm to 10 mm.

9. The apparatus of claim 1, wherein the processor is further configured to convert a light intensity, which is measured by the second detector and is changed according to a pressure applied to the transparent elastic body, into a contact pressure value.

10. The apparatus of claim 1, wherein the processor is further configured to obtain an oscillometric waveform envelope based on the PPG signal and the contact pressure signal, and estimate the blood pressure by using the obtained oscillometric waveform envelope.

11. The apparatus of claim 10, wherein the processor is further configured to obtain at least one feature value, based on at least one of a first contact pressure value at a maximum amplitude point, a second contact pressure value at a left point of the maximum amplitude point and having a preset ratio to the first contact pressure value in the oscillometric waveform envelope, or a third contact pressure value at a right point of the maximum amplitude point and having the preset ratio to the first contact pressure value, and estimate the blood pressure based on the obtained at least one feature value.

12. A sensor comprising:
    a transparent elastic body;
    a first polarizing film provided on a surface of the transparent elastic body and configured to come into contact with an object;
    a light source provided under the transparent elastic body and configured to emit a light toward the object;
    a first detector provided under the transparent elastic body and configured to detect a light, passing through the first polarizing film after being emitted by the light source and scattered or reflected from the object, to measure a photoplethysmography (PPG) signal; and
    a second detector provided under the transparent elastic body and configured to detect a light, not passing through the first polarizing film, to measure a contact pressure signal.

13. The sensor of claim 12, wherein the second detector is further configured to detect a light reflected from the transparent elastic body.

14. The sensor of claim 12, further comprising a second polarizing film provided over the second detector and configured to block the light passing through the first polarizing film.

15. The sensor of claim 14, wherein a polarization direction of the first polarizing film is perpendicular to a polarization direction of the second polarizing film.

16. The sensor of claim 14, wherein a polarization direction of the first polarizing film is a clockwise direction, and a polarization direction of the second polarizing film is a counterclockwise direction.

17. The sensor of claim 12, wherein the light source, the first detector, the second detector, and the transparent elastic body are spaced apart from each other by an air gap provided therebetween.

18. The sensor of claim 12, wherein the transparent elastic body has a thickness of 2 mm to 10 mm.

19. A method of estimating a blood pressure, by using a sensor comprising a transparent elastic body, a first polarizing film provided on the transparent elastic body, a light source, a first detector, and a second detector, the method comprising:
- by using the light source provided under the transparent elastic body, emitting light toward an object;
- by using the first detector provided under the transparent elastic body, detecting light, scattered or reflected from the object and passing through the first polarizing film, to measure a photoplethysmography (PPG) signal;
- by using the second detector provided under the transparent elastic body, detecting light, not passing through the first polarizing film, to measure a contact pressure signal; and
- estimating a blood pressure based on the PPG signal and the contact pressure signal.

20. The method of claim 19, wherein the estimating of the blood pressure comprises obtaining an oscillometric waveform envelope based on the PPG signal and the contact pressure signal, and estimating the blood pressure by using the obtained oscillometric waveform envelope.

* * * * *